United States Patent
Lee et al.

(10) Patent No.: US 9,203,295 B2
(45) Date of Patent: Dec. 1, 2015

(54) BLEEDING CIRCUIT AND METHOD FOR REDUCING POWER CONSUMPTION OF AN EMI FILTER

(75) Inventors: Yen-Te Lee, Chiayi County (TW); Kuo-Chi Liu, Hsinchu (TW); Fu-Sheng Tsai, Taoyuan County (TW); Kuang-Feng Li, Taichung (TW); Chung-Cheng Chang, Taichung (TW); Jiun-Hung Pan, Hsinchu County (TW); Chien-Fu Tang, Hsinchu (TW); Isaac Y. Chen, Hsinchu County (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 599 days.

(21) Appl. No.: 13/611,416

(22) Filed: Sep. 12, 2012

(65) Prior Publication Data

US 2013/0335038 A1    Dec. 19, 2013

(30) Foreign Application Priority Data

Jun. 19, 2012    (TW) .............................. 101121932 A (51) Int. Cl.
*H02M 1/36* (2007.01)
*H02M 1/12* (2006.01)
*H02M 1/00* (2007.01)
*H02M 1/32* (2007.01)

(52) U.S. Cl.
CPC ....... *H02M 1/126* (2013.01); *H02M 2001/0048* (2013.01); *H02M 2001/322* (2013.01); *Y02B 70/1491* (2013.01)

(58) Field of Classification Search
CPC .......... H02M 1/126; H02M 2001/322; H02M 2001/0048; Y02B 70/1491
See application file for complete search history.

(56) References Cited

U.S. PATENT DOCUMENTS

| | | | |
|---|---|---|---|
| 6,359,794 B1* | 3/2002 | Real | 363/17 |
| 8,508,960 B2* | 8/2013 | Chen et al. | 363/21.16 |
| 8,698,474 B2* | 4/2014 | Yang et al. | 323/287 |
| 2010/0271850 A1* | 10/2010 | Huang et al. | 363/26 |
| 2010/0309689 A1* | 12/2010 | Coulson | 363/16 |
| 2011/0249476 A1* | 10/2011 | Chen et al. | 363/52 |
| 2011/0305051 A1* | 12/2011 | Yang et al. | 363/49 |

* cited by examiner

*Primary Examiner* — Naum B Levin
(74) *Attorney, Agent, or Firm* — Muncy, Geissler, Olds & Lowe, P.C.

(57) ABSTRACT

A bleeding circuit and method for an electromagnetic interference filter detect whether or not an AC power source connected to the electromagnetic interference filter is removed, establish a discharge path for discharging a capacitor of the electromagnetic interference filter once the connected AC power source is removed, and cut off the discharge path during the AC power source is in connection to the electromagnetic interference filter for decreasing power consumption of the electromagnetic interference filter.

11 Claims, 6 Drawing Sheets

BLEEDING CIRCUIT AND METHOD FOR REDUCING POWER CONSUMPTION OF AN EMI FILTER

FIELD OF THE INVENTION

The present invention is related generally to an electromagnetic interference (EMI) filter and, more particularly, to a bleeding circuit and method for reducing power consumption of an EMI filter.

BACKGROUND OF THE INVENTION

Figure 1:
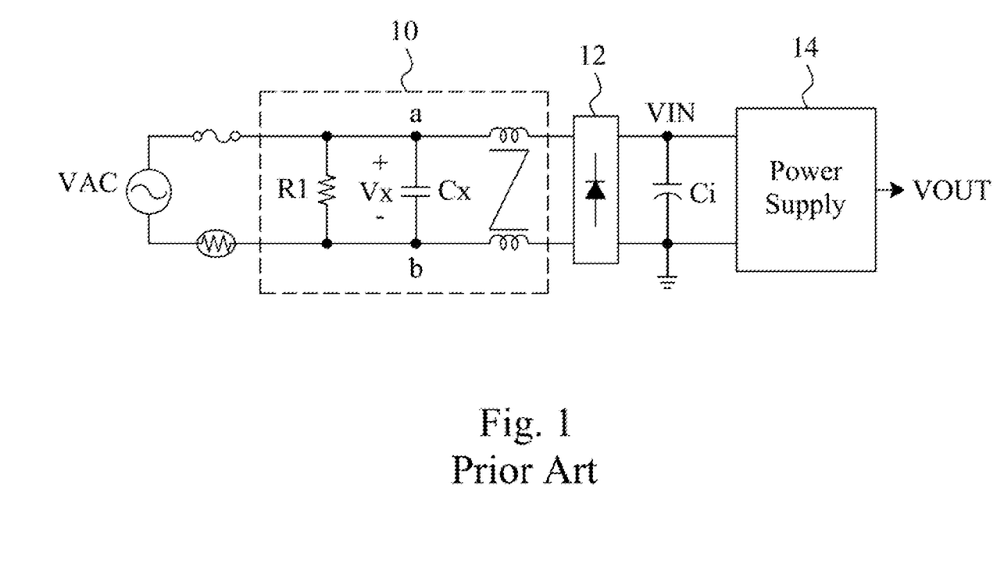
FIG. 1 is a circuit diagram of a conventional AC-to-DC converter.

Recently, driven by the energy crisis and the heightened awareness of environmental protection, the European Union, North America, and Japan have passed green laws and regulations regarding electronic equipment which not only regulate the conversion efficiency of such equipment but also impose stringent requirements on no-load or standby power consumption. In a conventional alternating current to direct current (AC-to-DC) converter, as shown in FIG. 1, an electromagnetic interference (EMI) filter 10 includes a capacitor Cx whose two ends a. and b are connected to an AC power source VAC, a bridge rectifier 12 rectifies the voltage Vx across the capacitor Cx to produces an input voltage VIN, and a power supply 14 converts the input voltage VIN into an output voltage VOUT. When the AC power source VAC is removed, the voltage Vx across the capacitor Cx can be as high as hundreds of volts. In order to prevent electric shock, a bleeding resistor R1 is connected in parallel to the capacitor Cx to establish a discharge path for discharging the capacitor Cx after the AC power source VAC is removed. However, in the course where the AC power source VAC continuously supplies electricity, a current keeps flowing through the bleeding resistor R1 and thus causes extra power consumption. Under currently applicable safety regulations, for example CEI/IEC 60950-1 Clause 2.1.1.7, the discharge time constant R1×Cx established by the capacitor Cx and the bleeding resistor R1 is required to be less than one second. Therefore, the higher the capacitance Cx is, the lower the resistance R1 must be, and the lower the resistance R1, the higher the power consumption caused thereby. Especially, when the system is in a standby mode, the power consumed by the bleeding resistor R1 accounts for a considerable proportion of the total no-load power consumption.

BRIEF SUMMARY OF THE INVENTION

An objective of the present invention is to provide a bleeding circuit and method for reducing power consumption of an EMI filter.

Another objective of the present invention is to provide a bleeding circuit which shares a pin and a high-voltage element with a high-voltage startup circuit of a power supply.

According to the present invention, a bleeding circuit for reducing power consumption of an EMI filter includes a rectifier circuit, a bleeding switch, and an AC brownout sensor. The rectifier circuit is connected to the two ends of a capacitor of the EMI filter to rectify a first voltage across the capacitor to thereby produce a second voltage. The two ends of the capacitor serve for connecting to an AC power source. Once the second voltage has continuously exceeded a threshold value for more than a preset time, the AC brownout sensor turns on the bleeding switch, which is connected between the rectifier circuit and a ground terminal, to establish a bleeding path for discharging the capacitor. The bleeding switch and the AC brownout sensor can be integrated into a control integrated circuit (IC) in such a way that the bleeding switch and the AC brownout sensor share a pin and a high-voltage element with a high-voltage startup circuit of the control IC. Thus, the number of pins, the circuit area, and the associated costs will be reduced.

According to the present invention, a bleeding method for reducing power consumption of an EMI filter includes rectifying a first voltage across a capacitor of the EMI filter to produce a second voltage, wherein the two ends of the capacitor serve for connecting to an AC power source, and establishing a bleeding path for discharging the capacitor once the second voltage has continuously exceeded a threshold value for more than a preset time.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 2:
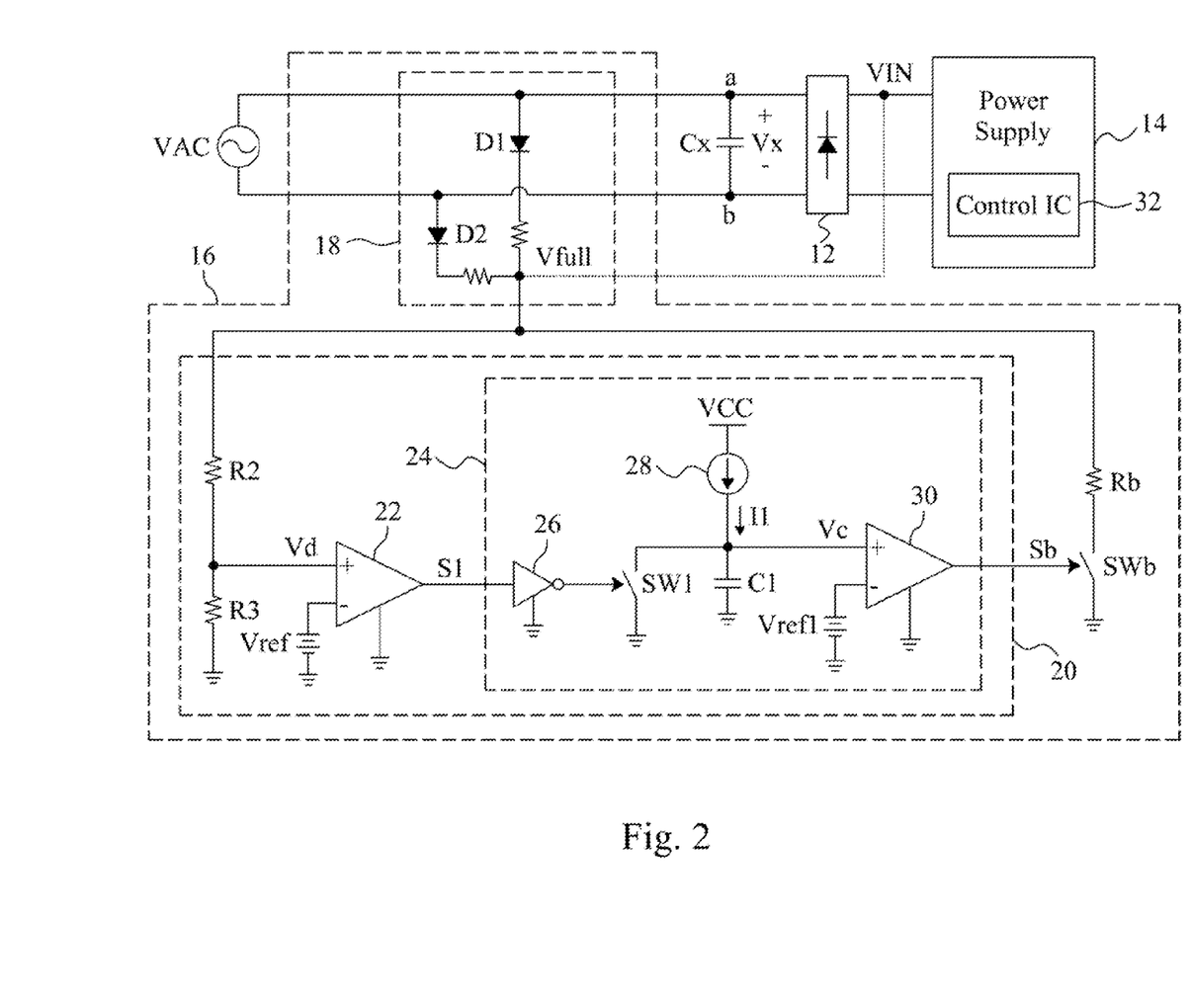
FIG. 2 is a circuit diagram showing a first embodiment according to the present invention.

FIG. 2 is a circuit diagram showing a first embodiment of a bleeding circuit 16 according to the present invention, in which the bleeding circuit 16 takes the place of the bleeding resistor R1 shown in FIG. 1, and includes a rectifier circuit 18, an AC brownout sensor 20, a current limiter Rb, and a bleeding switch SWb. The rectifier circuit 18 includes two diodes D1 and D2 which are respectively connected to the two ends a and b of the capacitor Cx, for full-wave rectifying the voltage Vx across the capacitor Cx to thereby produce a voltage Vfull. If the output terminal VIN of the bridge rectifier 12 does not have the large capacitor Ci shown in FIG. 1, the bridge rectifier 12 can serve in place of the rectifier circuit 18 to provide the full-wave rectified voltage Vfull. The AC brownout sensor 20 includes a voltage divider, established by resistors R2 and R3 for example, a comparator 22 and a timer 24, The voltage divider divides the voltage Vfull to generate a voltage Vd, the comparator 22 compares the voltage Vd with a reference voltage Vref and asserts a comparison signal S1 when the voltage Vd is higher than the reference voltage Vref, and the timer 24 counts the lasting time T1 of the comparison signal S1 and turns on the bleeding switch SWb once the lasting time T1 reaches a preset time T2. The bleeding switch SWb is connected between the rectifier circuit 18 and a ground terminal and when it is on, the rectifier circuit 18, the current limiter Rb, and the bleeding switch SWb will establish a discharge path for discharging the capacitor Cx. The current limiter Rb is serially connected to the bleeding switch SWb for limiting the discharge current flowing through the bleeding switch SWb, and is a resistor in this embodiment. In other embodiments, however, the current limiter may he other elements capable of limiting a current, such as a depletion-type MOSFET. The timer 24 shown in FIG. 2 is an analog circuit including a capacitor C1, a switch SW1 parallel connected to the capacitor C1, an inverter 26 connected to the switch SW1, a current source 28 connected to the capacitor C1, and a comparator 30 connected to the capacitor C1, in which the current source 28 provides a charge current I1 for charging the capacitor C1, the inverter 26 controls the switch SW1 responsive to the output signal S1 of the comparator 22 to charge and discharge the capacitor C1, and the comparator 30 compares the voltage Vc on the capacitor C1 with a reference voltage Vref1 to assert a comparison signal Sb for controlling the bleeding switch SWb. In other embodiments, the timer 24 may be a digital circuit established by an oscillator and a counter.

Typically the voltage Vfull is a high voltage and thus the comparator 22 in the AC brownout sensor 20 is required to be a high-voltage element, which nevertheless has drawbacks of requiring high costs and large circuit area However, by selecting the ratio between the resistances R2 and R3 to divide the high voltage Vfull to produce a lower voltage Vd, the comparator 22 may use a low-voltage or medium-voltage element to reduce costs and circuit area.

Figure 3:
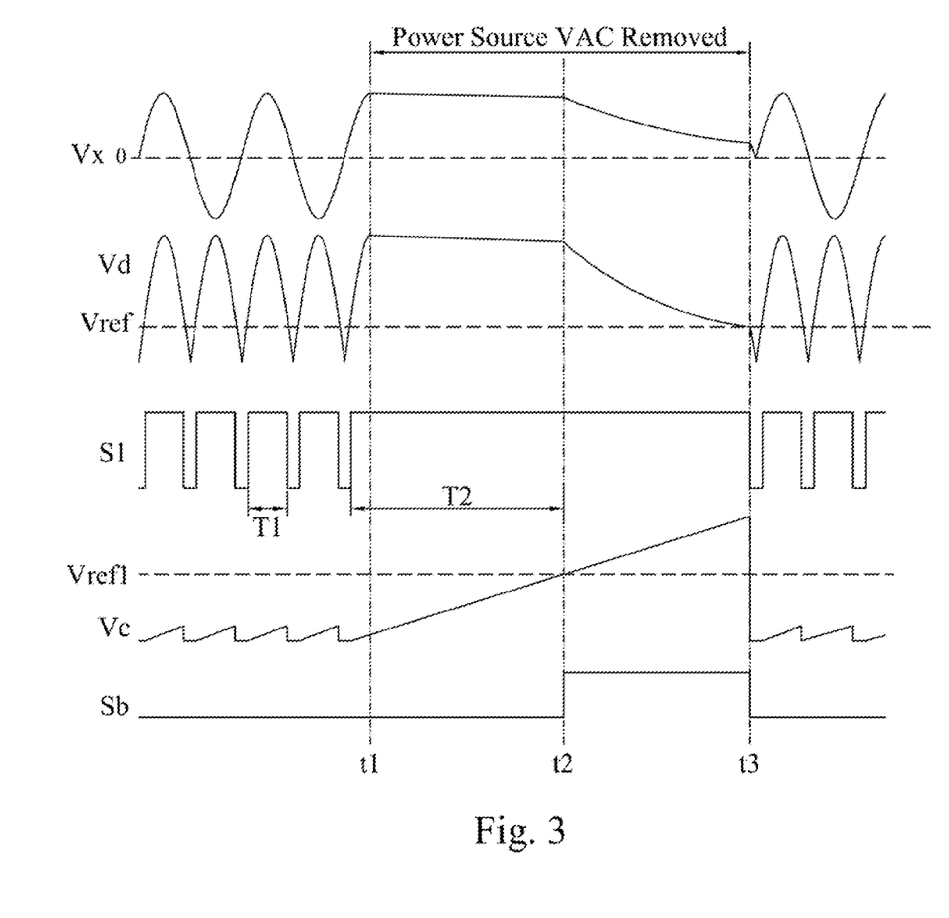
FIG. 3 is a waveform diagram of the circuit shown in FIG. 2.

FIG. 3 is a waveform diagram of the circuit shown in FIG. 2. Referring to FIG. 2 and FIG. 3, when the AC power source VAC is connected to the two ends a and b of the capacitor Cx, the voltage Vx across the capacitor Cx varies with the AC power source VAC, and the rectifier circuit 18 rectifies the voltage Vx to produce the voltage Vfull. When the voltage Vfull is higher than a preset threshold value, i.e., when the voltage Vd is higher than the reference voltage Vref, the comparator 22 asserts the comparison signal S1 and thus turns off the switch SW1 in the timer 24, so that the capacitor C1 is charged to produce an increasing voltage Vc. When the voltage Vfull is lower than the threshold value, i.e., when the voltage Vd is lower than the reference voltage Vref, the comparator 22 turns off the comparison signal S1 and thus turns on the switch SW1 to reset the capacitor C1, bringing the voltage Vc to zero. While the AC power source VAC stays in connection to the capacitor Cx, the waveform of the voltage Vd shows periodic variations, and the lasting time T1 of the comparison signal S1 is substantially constant and incapable of raising the voltage Vc on the capacitor C1 to the reference voltage Vref1. Hence, the bleeding switch SWb remains off and thus keeps the discharge path cut off, thereby reducing, power consumption.

Once the AC power source VAC is removed, as shown by time t1 in FIG. 3, the voltage Vx across the capacitor Cx will stay at the same level as in the instant when the AC power source VAC is removed, and because of that, the voltage Vd will remain fixed, too. If the voltage Vd in the aforesaid instant is higher than the reference voltage Vref, the comparator 22 will continuously assert the comparison signal S1 and thus keep the voltage Vc increasing, as shown during the period from time t1 to time t3 in FIG. 3. Once the lasting time T1 of the comparison signal S1 reaches the preset time T2, as shown by time t2 in FIG. 3, the voltage Vc becomes higher than the reference voltage Vref1, and the comparator 30 triggers the comparison signal Sb to turn on the bleeding switch SWb. In consequence, the rectifier circuit 18, the current limiter Rb, and the bleeding switch SWb establish a discharge path through which the capacitor Cx can be discharged.

All or some of the elements of the bleeding circuit 16 shown in FIG. 2 can be integrated into an IC, such as a control IC 32 of the power supply 14.

Figure 4:
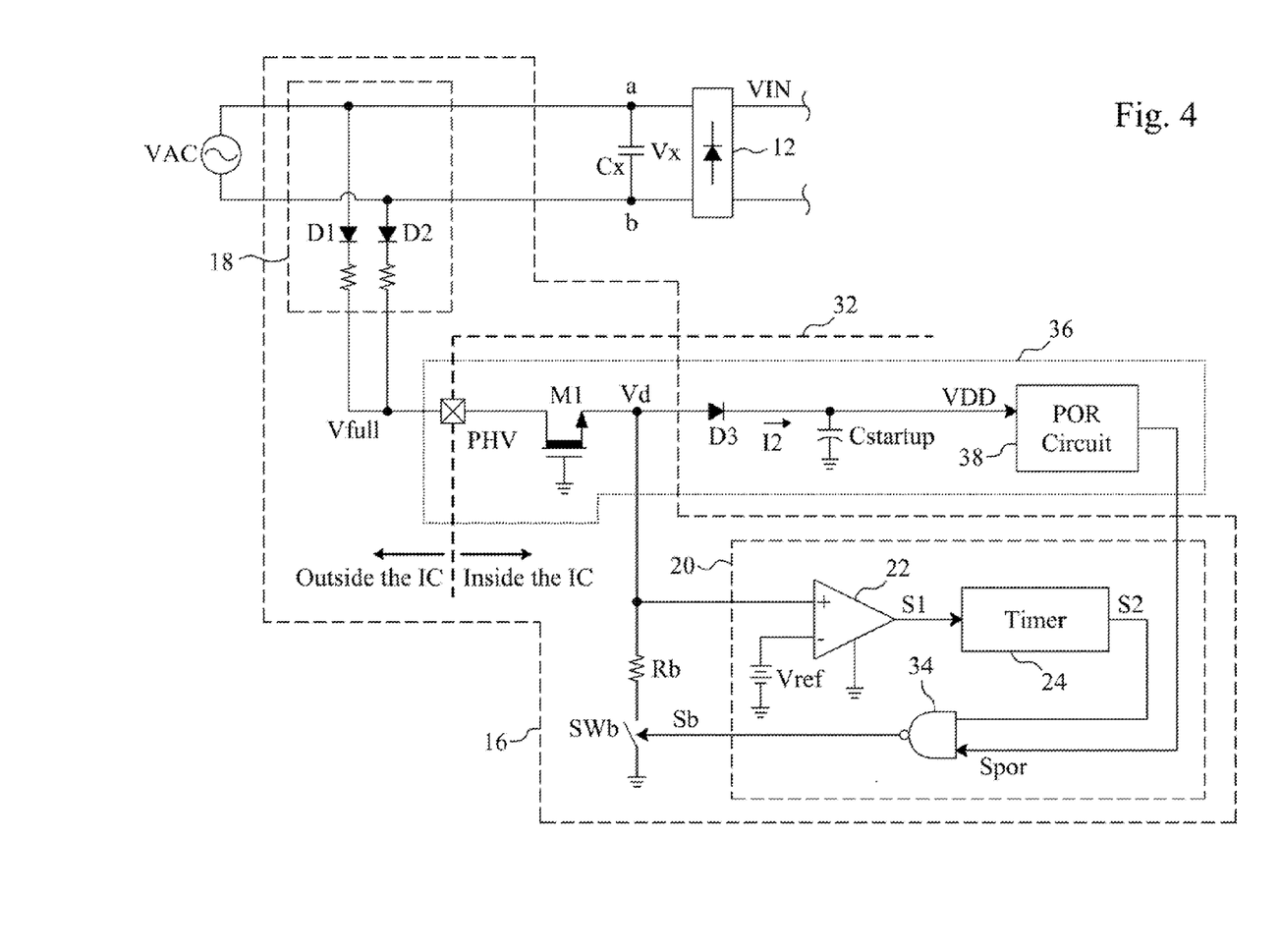
FIG. 4 is a circuit diagram showing a second embodiment according to the present invention.

FIG. 4 is a circuit diagram showing a second embodiment of a bleeding circuit 16 according to the present invention, in which the bleeding circuit 16 includes a rectifier circuit 18, a high-voltage element M1 having a voltage limiting function, a current limiter Rb, a bleeding switch SWb, and an AC brownout sensor 20, of which, except for the rectifier circuit 18, all the elements are integrated into the control IC 32 of the power supply 14. With the bleeding circuit 16 sharing a pin PHV and the high-voltage element M1 that are originally used by a high-voltage startup circuit 36 already existing in the control IC 32, both costs and circuit area are reduced. The rectifier circuit 18 rectifies the voltage Vx across the capacitor Cx to produce a voltage Vfull applied to the pin PHV of the control IC 32. If the output terminal VIN of the bridge rectifier 12 does not have the large capacitor Ci shown in FIG. 1, the bridge rectifier 12 can serve in place of the rectifier circuit 18 to provide the voltage Vfull. The high-voltage element M1 has its input terminal connected to the pin PHV to receive the voltage Vfull, limits the maximum value of the voltage Vfull, and generates a voltage Vd at its output terminal. The high-voltage element M1 can be a junction field-effect transistor (JFET) or a depletion-type MOSFET, either of which has a negative value threshold voltage, and thus, when the voltage Vfull is lower than −Vth, the high-voltage element M1 will be turned on to have the voltage Vd equal to Vfull, and when the voltage Vfull is higher than −Vth, the high-voltage element M1 pinches off so that the voltage Vd is equal to −Vth. The current limiter Rb and the bleeding switch SWb are connected in series between the output terminal of the high-voltage element M1 and a ground terminal, so that the current limiter Rb will limit the discharge current flowing through the bleeding switch SWb when the latter is on. In this embodiment, the current limiter Rb is a resistor, while in other embodiments, the current limiter may be other elements capable of limiting a current, such as a depletion-type MOSFET. After the AC brownout sensor 20 starts up b a power-on-reset (POR) signal Spor, it will detect the voltage Vd and thereby recognizes whether the AC power source VAC has been removed. If the AC brownout sensor 20 identifies that the AC power source VAC has been removed, it will assert the signal Sb to turn on the bleeding switch SWb, thereby establishing a discharge path for discharging the capacitor Cx. In this embodiment, since the high-voltage element M1 limits the value of the voltage Vd that will be inputted to the comparator 22, the current limiter Rb, and the bleeding switch SWb, the latter three elements may use low-voltage or medium-voltage elements to reduce costs and circuit area.

Referring to FIG. 4, when the AC power source VAC is initially connected to the two ends a and b of the capacitor Cx, a current 12 is generated which flows through the rectifier circuit 18, the high-voltage element M1, and a diode D3 to charge a capacitor Cstartup in the high-voltage startup circuit 36. Once the voltage VDD on the capacitor Cstartup reaches a threshold value, a POR circuit 38 triggers a high-level FOR signal Spor to start up the AC brownout sensor 20 and other circuits in the control IC 32, thereby starting up the control IC 32. The voltage VDD may serve as a power supply voltage supplied to the AC brownout sensor 20 and other circuits in the control IC 32 either directly or after regulation by a voltage regulator.

In the embodiment shown in FIG. 4, the AC brownout sensor 20 includes the comparator 22, the timer 24, and a NAND gate 34 which determines the signal Sb according to a signal S2 from the timer 24 and the POP signal Spot from the POR circuit 38. Once the control IC 32 starts up, the POR signal Spor will stay high, so that the signal Sb is determined by the signal S2. After the bleeding circuit 16 starts up, the AC brownout sensor 20 will keep detecting the voltage Vd, and as long as the AC power source VAC is connected to the two ends a and b of the capacitor Cx, the waveform of the voltage Vd will vary periodically, the lasting time T1 of the comparison signal S1 sent from the comparator 22 is substantially fixed and is shorter than the preset time T2, and thus the timer 24 provides a high-level signal S2 to turn off the bleeding switch SWb and thereby cut off the discharge path. Once the AC power source VAC is removed, if the voltage Vd in the instant of the removal is higher than the reference voltage Vref, the comparator 22 will keep asserting the comparison signal S1, and upon detecting that the lasting time T1 of the comparison signal S1 exceeds the preset time T2, the timer 24 sends out a low-level signal S2 to trigger the signal Sb, thereby turning on the bleeding switch SWb. As a result, the rectifier circuit 18, the high-voltage element M1, the current limiter Rb, and the bleeding switch SWb establish a discharge path for discharging the capacitor Cx. Preferably, the discharge current through the bleeding switch SWb is lower than the current through the high-voltage element M1.

The timer 24 shown in FIG. 4 may have the same circuit as that shown in FIG. 2, which includes the inverter 26, the switch SW1, the current source 28, the capacitor C1, and the comparator 30, while the positive input and the negative input of the comparator 30 are arranged to receive the reference voltage Vref1 and the voltage Vc, respectively, in other embodiments, the timer 24 may be a digital circuit established by an oscillator and a counter.

Figure 5:
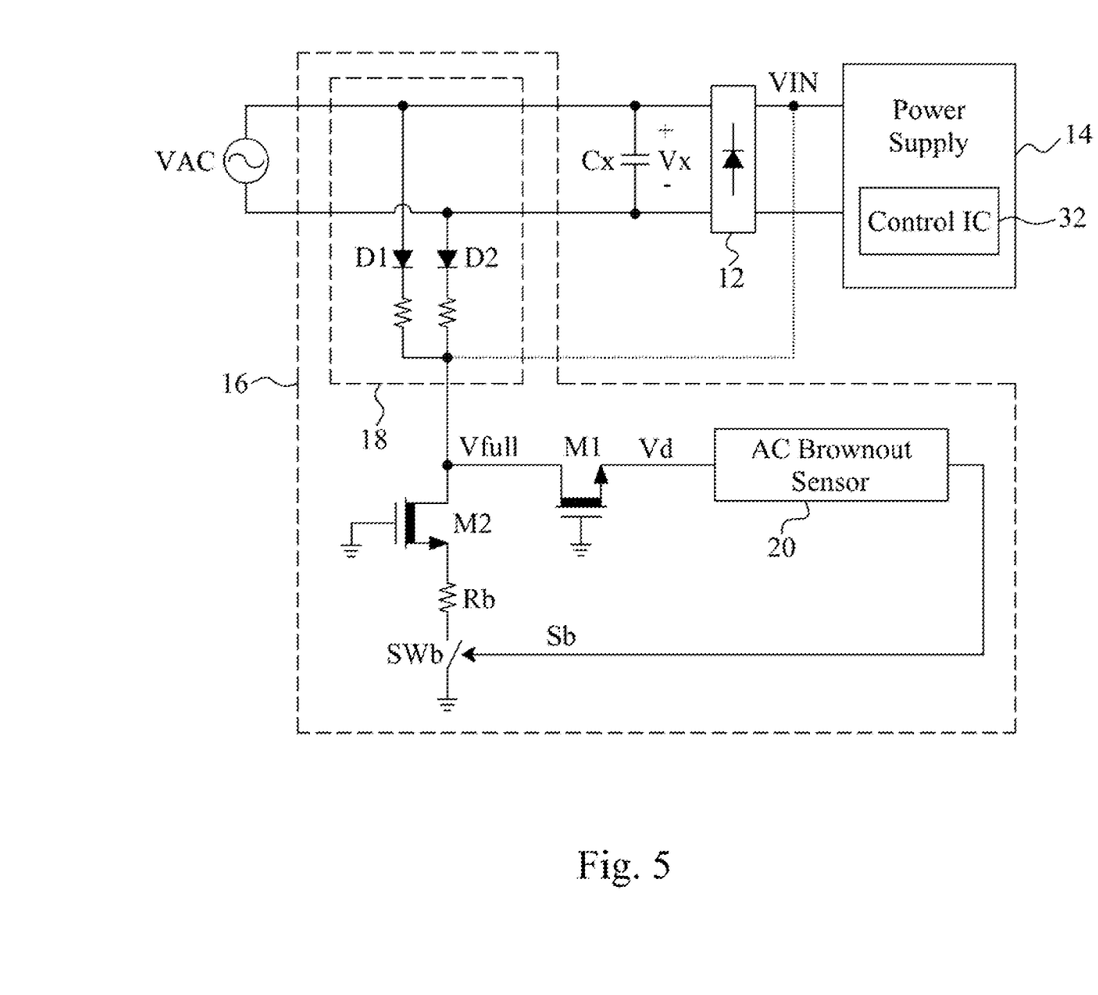
FIG. 5 is a circuit diagram showing a third embodiment according to the present invention.

FIG. 5 is a circuit diagram showing a third embodiment of a bleeding circuit 16 according to the present invention, which has the same circuit as shown in FIG. 4, except that the current limiter Rb and the bleeding switch SWb are serially connected between the input terminal, of the high-voltage element M1 and a ground terminal, and a high-voltage element M2 is additionally included between the input terminal of the high-voltage element M1 and the current limiter Rb for limiting the voltage supplied to the current limiter Rb and the bleeding switch SWb, so that both the current limiter Rb and the bleeding switch SWb may use low-voltage or medium-voltage elements to reduce costs and circuit area. The high-voltage element M2 can be a JFET or a depletion-type MOSFET. When the AC power source VAC is connected to the two ends a and b of the capacitor Cx, the AC brownout sensor 20 turns off the bleeding switch SWb to cut off the discharge path. Once the AC power source VAC is removed, if the voltage Vd is higher than the reference voltage Vref in the instant of the removal and has a lasting time T1 longer than a preset time T2, the AC brownout sensor 20 will turn on the bleeding switch SWb so that the rectifier circuit 18, the high-voltage element M2, the current limiter Rb, and the bleeding switch SWb establish a discharge path for discharging the capacitor Cx.

In the embodiment shown in FIG. 5, the high-voltage elements M1 and M2, the current limiter Rb, the bleeding switch SWb, and the AC brownout sensor 20 in the bleeding circuit 16 can be integrated into the control IC 32 of the power supply 14, and the same as the case shown in FIG. 4, the bleeding circuit 16 can share the pin PHV and the high-voltage element M1 with the high-voltage startup circuit 36. In addition, if the output terminal VIN of the bridge rectifier 12 does not have the large capacitor Ci shown in FIG. 1, the bridge rectifier 12 can serve in lieu of the rectifier circuit 18 to provide the voltage Vfull.

Figure 6:
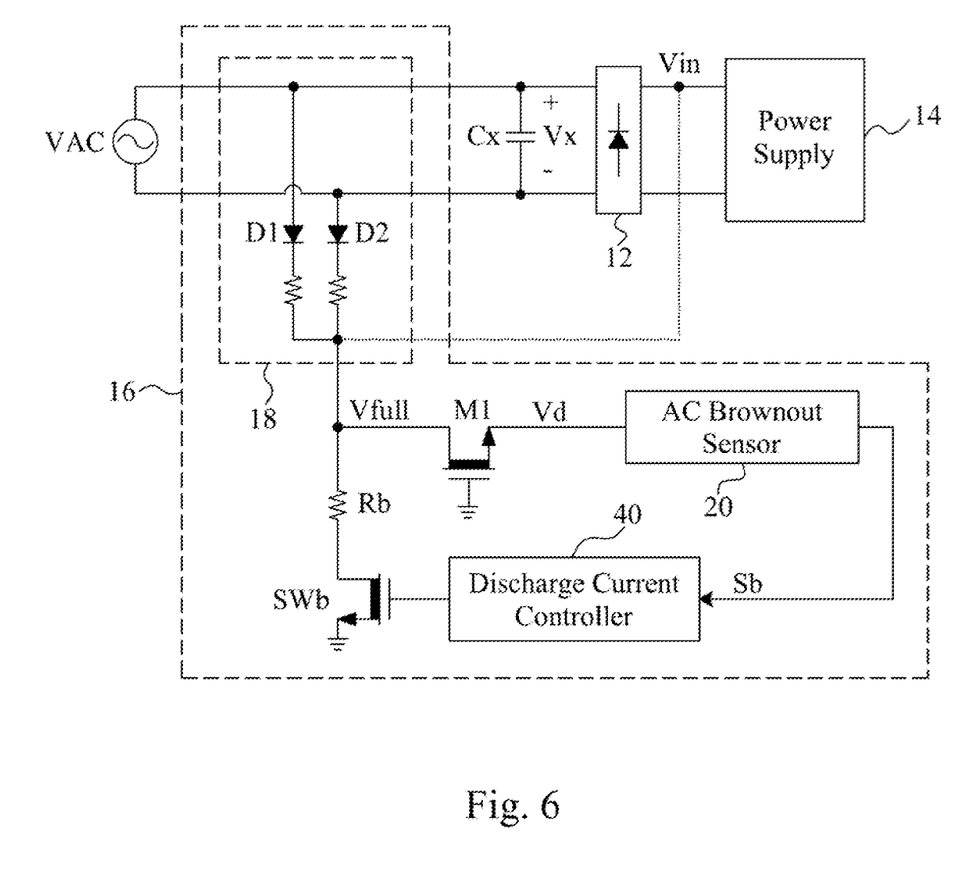
FIG. 6 is a circuit diagram showing a fourth embodiment according to the present invention.

FIG. 6 is a circuit diagram showing a fourth embodiment of a bleeding circuit 16 according to the present invention, which has the same circuit as shown in FIG. 4, except that the current limiter Rb and the bleeding switch SWb are serially connected between the input terminal of the high-voltage element M1 and a ground terminal, the bleeding switch SWb is a high-voltage element, such as JFET or depletion-type MOSFET, and a discharge current controller 40 is additionally included for controlling the bleeding switch SWb according to the signal Sb from the AC brownout sensor 20. When the AC power source VAC is connected to the two ends a and b of the capacitor Cx, the bleeding switch SWb is turned of to cut off the discharge path. Once the AC power source VAC is removed, if the voltage Vd is higher than the reference voltage Vref in the instant of the removal and has a lasting time T1 longer than a preset time T2, the AC brownout sensor 20 asserts the signal Sb to signal the discharge current controller 40 to turn on the bleeding switch SWb, so that the rectifier circuit 18, the current limiter Rb, and the bleeding switch SWb establish a discharge path through which the capacitor Cx can be discharged. The discharge current controller 40 may also control the value of the discharge current through the bleeding switch SWb according to the signal Sb.

In the embodiment shown in FIG. 6, the high-voltage element M1, the current limiter Rb, the bleeding switch SWb, the AC brownout sensor 20, and the discharge current controller 40 can he integrated into the control IC 32 of the power supply 14, and the same as the case shown in FIG. 4, the bleeding circuit 16 can share the pin PHV and the high-voltage element M1 with the high-voltage startup circuit 36. In addition, if the output terminal VIN of the bridge rectifier 12 does not have the large capacitor Ci shown in FIG. 1, the bridge rectifier 12 can serve in lieu of the rectifier circuit 18 to provide the voltage Vfull.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A bleeding circuit for reducing power consumption of an electromagnetic interference filter including a capacitor having two ends serve for connecting to an AC power source, the bleeding circuit comprising:
    a rectifier circuit connected to the two ends of the capacitor of the electromagnetic interference filter, configured to rectify a first voltage across the capacitor of the electromagnetic interference filter to produce a second voltage;
    a bleeding switch connected between the rectifier circuit and a ground terminal;
    an AC brownout sensor connected to the bleeding switch, configured to turn on the bleeding switch once the second voltage has continuously exceeded a threshold value for more than a preset time, to thereby establish a bleeding path for discharging the capacitor of the electromagnetic interference filter; and
    a high-voltage element connected to the rectifier circuit and the AC brownout senor, configured to receive the second voltage and limit a maximum value of the second voltage, to thereby generate a third voltage provided to the AC brownout sensor.

2. The bleeding circuit of claim 1, wherein the AC brownout sensor comprises:
    a comparator connected to the high-voltage element, configured to compare the third voltage with a reference voltage, to thereby assert a comparison signal when the third voltage is higher than the reference voltage; and
    a timer connected to the comparator and the bleeding switch, configured to count a lasting time of the comparison signal, to thereby trigger a signal to turn on the bleeding switch once the lasting time reaches the preset time.

3. The bleeding circuit of claim 1, wherein the high-voltage element is a JFET or a depletion-type MOSFET.

4. The bleeding circuit of claim 1, wherein the bleeding switch is connected to the rectifier circuit through the high-voltage element.

5. The bleeding circuit of claim 4, wherein the bleeding switch conducts a discharge current lower than a current through the high-voltage element when it is on.

6. The bleeding circuit of claim 1, wherein the bleeding switch, the AC brownout sensor, and the high-voltage element are integrated into a control integrated circuit.

7. The bleeding circuit of claim 6, wherein the high-voltage element provides a current to a startup capacitor of the control integrated circuit to start up the control integrated circuit.

8. The bleeding circuit of claim 1, further comprising a current limiter serially connected to the bleeding switch, configured to limit a maximum discharge current through the bleeding switch.

9. A bleeding circuit for reducing power consumption of an electromagnetic interference filter including a capacitor having two ends serve for connecting to an AC power source, the bleeding circuit comprising:
   a rectifier circuit connected to the two ends of the capacitor of the electromagnetic interference filter, configured to rectify a first voltage across the capacitor of the electromagnetic interference filter to produce a second voltage;
   a bleeding switch connected between the rectifier circuit and a ground terminal;
   an AC brownout sensor connected to the bleeding switch, configured to turn on the bleeding switch once the second voltage has continuously exceeded a threshold value for more than a preset time, to thereby establish a bleeding path for discharging the capacitor of the electromagnetic interference filter; and
   a high-voltage element connected between the rectifier circuit and the bleeding switch, configured to limit a maximum voltage supplied to the bleeding switch.

10. The bleeding circuit of claim 9, wherein the high-voltage element is a JFET or a depletion-type MOSFET.

11. A bleeding method for reducing power consumption of an electromagnetic interference filter including a capacitor having two ends serve for connecting to an AC power source, the bleeding method comprising:
   A.) rectifying a first voltage across the capacitor of the electromagnetic interference filter to produce a second voltage; and
   B.) detecting the second voltage, and establishing a bleeding path for discharging the capacitor of the electromagnetic interference filter once the second voltage has continuously exceeded a threshold value for more than a preset time, wherein the step B comprises:
   limiting a maximum value of the second voltage to generate a third voltage; and
   establishing the bleeding path when the third voltage has continuously exceeded a reference voltage for more than the preset time.

* * * * *